(12) United States Patent
Pendleton et al.

(10) Patent No.: US 12,152,684 B2
(45) Date of Patent: Nov. 26, 2024

(54) FLUID END USING CARTRIDGE CHECK VALVE AND WEDGE RETENTION SYSTEM

(71) Applicant: GARTECH, LLC, Houston, TX (US)

(72) Inventors: Gary Pendleton, Shotley Bridge (GB); Gary Warren Stratulate, Houston, TX (US)

(73) Assignee: Gartech, LLC, Houston, TX (US)

( * ) Notice: Subject to any disclaimer, the term of this patent is extended or adjusted under 35 U.S.C. 154(b) by 0 days.

(21) Appl. No.: 17/520,061

(22) Filed: Nov. 5, 2021

(65) Prior Publication Data

US 2022/0390029 A1 Dec. 8, 2022

Related U.S. Application Data

(63) Continuation-in-part of application No. 17/337,572, filed on Jun. 3, 2021.

(51) Int. Cl.
F16K 27/00 (2006.01)
E21B 43/26 (2006.01)
F16K 27/02 (2006.01)

(52) U.S. Cl.
CPC ........ F16K 27/003 (2013.01); E21B 43/2607 (2020.05); F16K 27/0209 (2013.01)

(58) Field of Classification Search
CPC ............................... F16K 27/003; F04B 53/16
See application file for complete search history.

(56) References Cited

U.S. PATENT DOCUMENTS

| | | | |
|---|---|---|---|
| 2,882,925 A * | 4/1959 | Smolensky | F16K 15/063 137/542 |
| 4,573,886 A | 3/1986 | Maasberg et al. | |
| 7,681,589 B2 | 3/2010 | Schwegman | |
| 9,739,130 B2 * | 8/2017 | Young | F04B 53/007 |
| 2003/0089403 A1 * | 5/2003 | Duncan | E03B 7/077 137/512 |
| 2013/0306167 A1 | 11/2013 | Sisk et al. | |
| 2019/0040966 A1 | 2/2019 | Myers et al. | |
| 2019/0145400 A1 * | 5/2019 | Graham | F04B 19/22 417/53 |
| 2019/0264683 A1 * | 8/2019 | Smith | F04B 1/0538 |
| 2021/0270382 A1 * | 9/2021 | Sherbeck | F16K 1/32 |

OTHER PUBLICATIONS

Office Action Summary for U.S. Appl. No. 17/337,572 dated Sep. 21, 2023. PDF file. 14 pages.

* cited by examiner

*Primary Examiner* — Reinaldo Sanchez-Medina
*Assistant Examiner* — Nicole Gardner
(74) *Attorney, Agent, or Firm* — C. Tumey Law Group PLLC

(57) ABSTRACT

Embodiments presented provide for a fluid end that has cartridge style check valves that may be serviced through a vertical bore.

19 Claims, 15 Drawing Sheets

FLUID END USING CARTRIDGE CHECK VALVE AND WEDGE RETENTION SYSTEM

CROSS-REFERENCE TO RELATED APPLICATIONS

The present application claims priority to U.S. patent application Ser. No. 17/337,572, filed Jun. 3, 2021, the entirety of which is incorporated by reference.

FIELD OF THE DISCLOSURE

Aspects of the disclosure relate to fluid ends. More specifically, aspects of the disclosure relate to a sacrificial portion that connects to fluid end devices to enable the fluid end device to withstand service pressures and flows for long periods.

BACKGROUND

Fluid end assemblies are used extensively with Well Service Pump Units, used within the Oil & Gas industry predominantly, to pressurize a fluid prior to the fluids use in oil well construction and production.

Fluid ends are generally connected to a reciprocating pumping mechanism. The reciprocating mechanism being a crank slider mechanism to which is attached a piston/plunger. A typical conventional fluid end is illustrated in FIG. 1. As the piston moves forward in conjunction with the fluid end, fluid is forcibly moved within the fluid ends discharging out of the fluid end via an upper check valve. Similarly, on the back stroke of the piston fluid is drawn into the fluid end through a check valve assembly filling the fluid end void, ready for its discharge in the forward stroke.

Within the main fluid end block, the internal profiles are generated to locate the relevant components. The check valve elements are of particular note, in that the fluid end is profiled vertically with a complex geometry to successfully located the valve seats and the valve construction made of a number of elements-springs, location clips, valve. The vertical bore is then sealed with a plug and screwed nut to close the unit for pressure tightness.

The upper and lower check valves have a valve seat (which needs to be accurately located within the fluid end body) and various clips and springs to effect the operation of the valves. Typically the upper check valve is assembled through the top of the fluid end, with the lower check valve assembled from the side through the horizontal plug bore. Typical conventional valve components are illustrated in FIG. 2. Such valve components are prone to wear and breakable during extended service life.

Check valves are considered as a consumable product and as such need regular maintenance and replacement. This maintenance and replacement can be problematic due to access constraints (small components fitting into relatively small bores). Success of a valve set is influenced as to how well the valve set is assembled to prevent wash-out (a term related to the erosion of components by the fluid passing through the fluid end). Further components can become seized within the bores adding to the problematic maintenance of the valves. Should the valve seats become seized, for example, heavy hydraulic equipment is required to extract the stuck seat. Consequently, downtime for an operation pump can be quickly accumulated. Something the operators wish to minimize as much as possible.

Following a successful replacement of the valves, the bores are sealed with a combination of plug and screwed nut. Due to the size of the screwed nut and the pressure it is working against, considerable torque is required to tighten the nut. There are types of nuts which can utilise hydraulic tightening devices, how there is still substantial use of the 'hammer nut' style screwed nut. As the name suggests this nut is hammered tight, resulting in variability of the tightening (and therefore sealing). It is known that these nuts can release gradually due to the pulsating effect of the internal pressure resulting in failure of the seals and potential damage to the valves, resulting in further maintenance requirements.

Fluid end monoblocks have historically been manufactured with AISI 4130 steel. The very nature of the pumping operation promotes fatigue stress cracking, resulting in premature failure of the fluids ends. While attempts are made welding failed areas and re-machining, these activities are both expensive and complex to achieve a good result. Further, the basic design of the flock remains the same, so fatigue cracking will re-establish in the block, resulting in failure at which point the units are scrapped.

Other attempts have been made to prolong the life of fluid ends with geometric changes and autofrettaging of bores, in an attempt to reduce stresses associated with fatigue cracking. These attempts to reduce fatigue cracking and do extend the life expectancy, but not eliminating it.

With regard to steel, the endurance limit is consideration with fatigue. Typically for steel, the endurance limit is approximately 50% of the ultimate tensile strength of the steel. For example, steel AISI 4130 having a UTS of 110 ksi will have an endurance limit of approximately 55 ksi, whereby if induced stresses are less than the endurance limit, the life of the component can be considered infinite.

When stresses are higher than the endurance limit and generally less than the yield strength, this is the area of consideration for fatigue stress.

Stresses developed in fluid ends vary depending on the geometric shapes and pressure applied and result in areas of stresses concentration generally less than the yield strength, this is the area of consideration for fatigue stress.

Stresses developed in fluid ends vary depending on the geometric shapes and pressure applied and result in areas of stresses concentration generally below the yield limit (approximately 85 ksi for AISI 4130), resulting in fatigue cracking of the blocks.

As well as geometric developments and autofrettaging, new choices in material selection have been made AISI 4330v (a modified 4130 variant), has proven successful to a degree further extending the fluid of fluid ends. Stainless steel variants have also proven very successfully extending the fluid end life by 5 to 6 times (over a 4130 variant). With more exotic materials comes a higher price premium. The operators need to consider his operational costs versus performance requirements, to achieve his desire results.

With AISI 4130 fluid ends, they can be susceptible to fatigue cracking failing in less than 300 hours of operation in certain applications. The operator has then the choice of replacing with new or welding and remachining the current scrap fluid ends.

There is a need to provide a design utilizing a stainless-steel sleeve arrangement and utilizing the cartridge style check valves, so the operator can gain several benefits within a reworked design.

There is a need to provide a system that has a superior check valve construction compared to conventional units.

There is a further need to provide a system that alleviate the drawbacks of hammered nut designs currently used in conventional apparatus.

There is a further need to provide a system that allow a fluid end to have superior operational life for operational personnel.

There is a further need to provide a system with the above attributes while being inexpensive to manufacture as well as maintain.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one example embodiment, an arrangement is disclosed. The arrangement may comprise a block configured with at least one bore, wherein each block has been previously used in a hydraulic fluid transfer operation and wherein the block is configured with at least one machined surface to remove metallurgical defects from the block. The arrangement may also comprise at least one sleeve configured to be inserted into each of the at least one bore. The arrangement may also comprise at least a first check valve and a second check valve inserted into each sleeve of the at least one sleeve. The arrangement may also comprise at least one piston configured to reciprocate within the block. The arrangement may also be configured wherein the first check valve and the second check valve are within the block. The arrangement may also comprise a bottom seal positioned at one end of the at least one bore and another seal positioned at an opposite end of the at least one bore. The arrangement may also comprise a wedge retaining system configured to maintain at least two of the first check valve, the second check valve, the bottom seal and the another seal in a relative position.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not be considered limiting of its scope, for the disclosure may admit to other equally effective embodiments.

Figure 1:
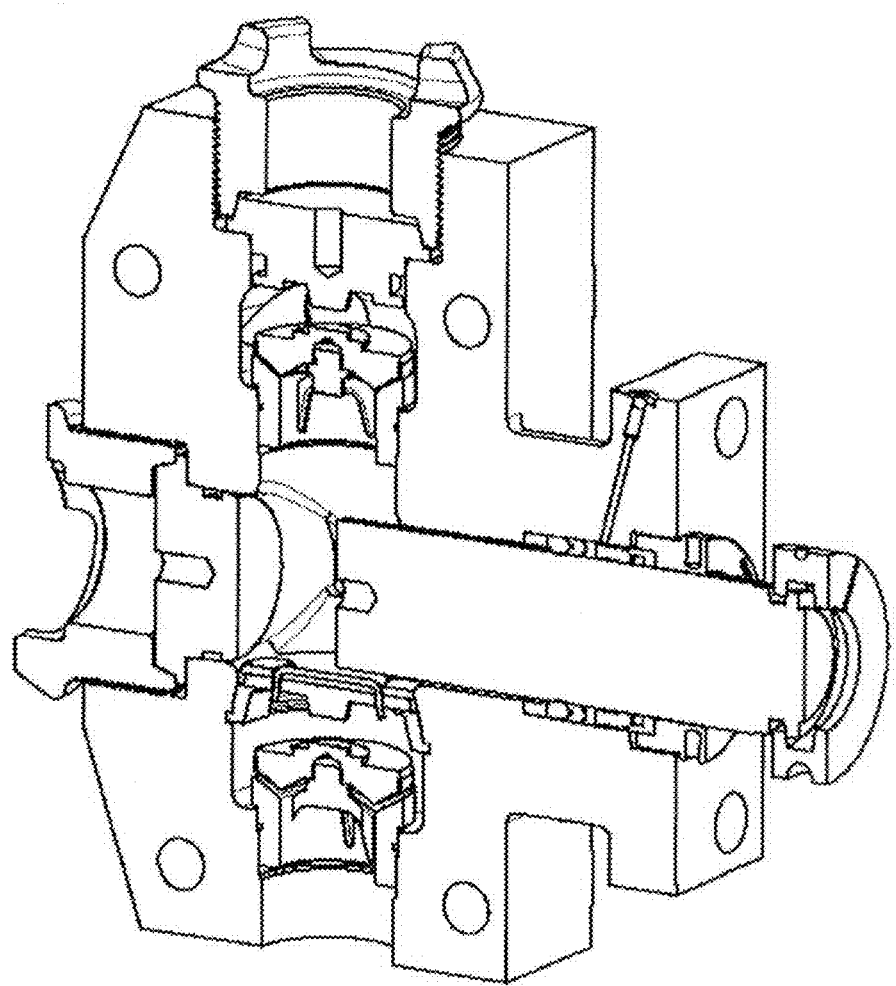
FIG. 1 is a side cross-sectional view of a conventional fluid end block and check valve system.
Figure 2:
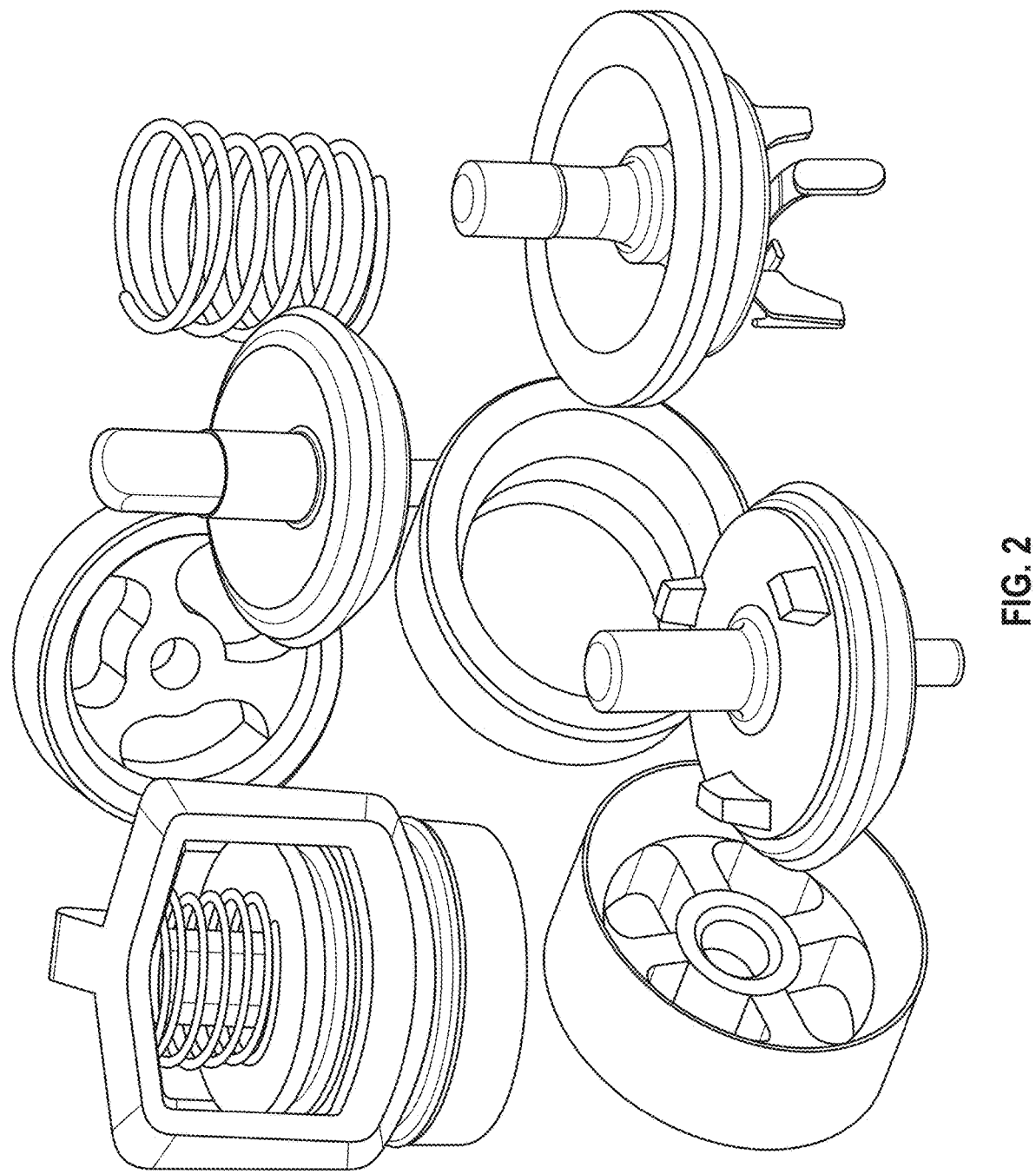
FIG. 2 is a side perspective view of conventional check valve components.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, components, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on." "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Figure 3:
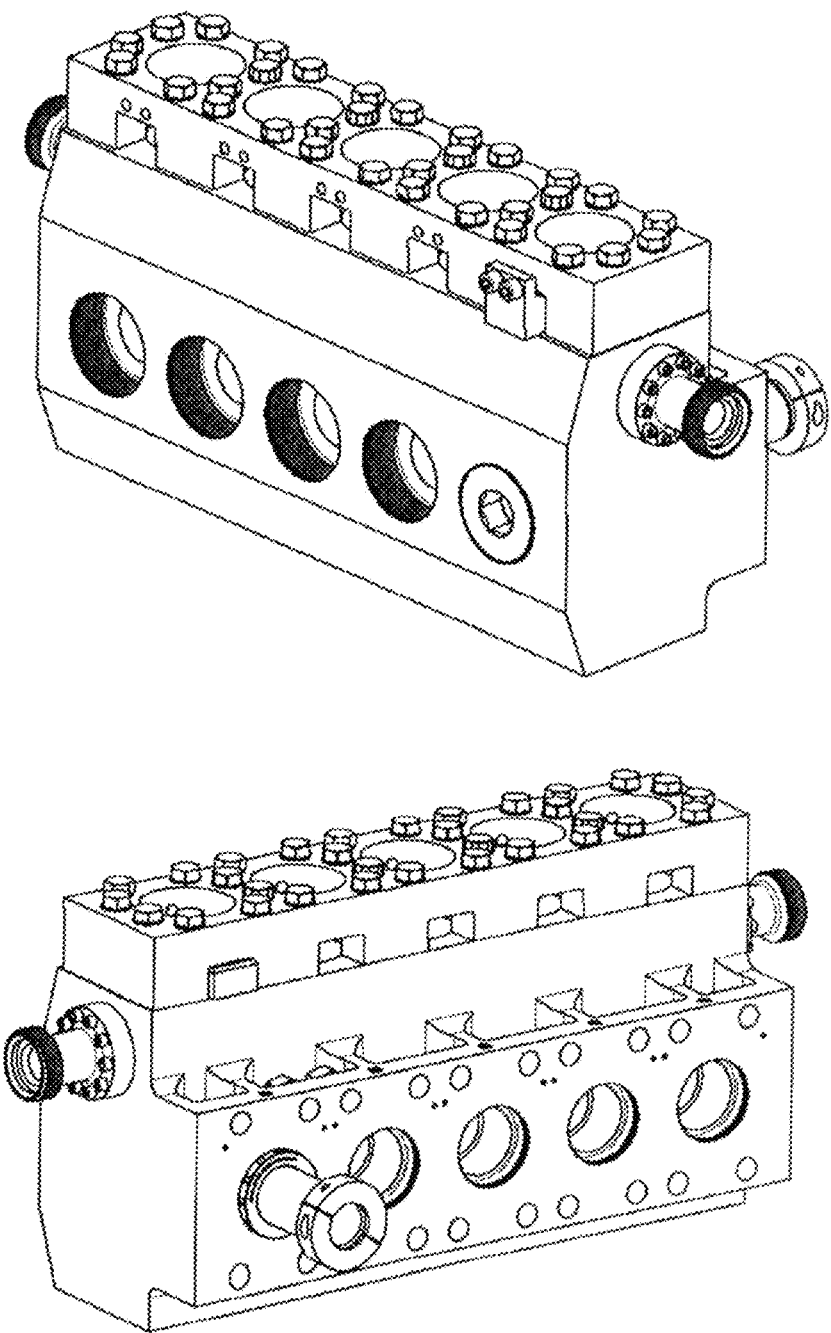
FIG. 3 is a left and right side perspective view of a fluid end block with associated piston and check valve arrangement in accordance with one example embodiment of the disclosure.

Referring to FIG. 3, a left and right perspective view of embodiments of the disclosure are illustrated. During conventional apparatus service lives, different types of difficulties arise for operations staff. Check valves may become clogged and non-operational. Leak paths may develop after repeated closing and opening of check valves. Locations of check valves are non-optimal, wherein operators must try to access check valves in designs that are not conducive to maintenance activities. Fluid ends, moreover, have expensive machining costs, thereby increasing the overall cost for operators.

Aspects of the disclosure provide for a remedy for each drawback discussed above. Check valve construction is provided in a unitary configuration, thereby allowing operators the ability to simply replace a cartridge style unit, greatly enhancing serviceability of the fluid end. The fluid end itself is designed to allow operators the ability to easily access valves from the top of the fluid end, allowing maintenance personnel the access that is needed in field locations. Aspects of the disclosure allow for maintaining a retention capability of inserted components through a component retention wedge that allows for easy installation and precise control of stresses within the fluid end.

Figure 4:
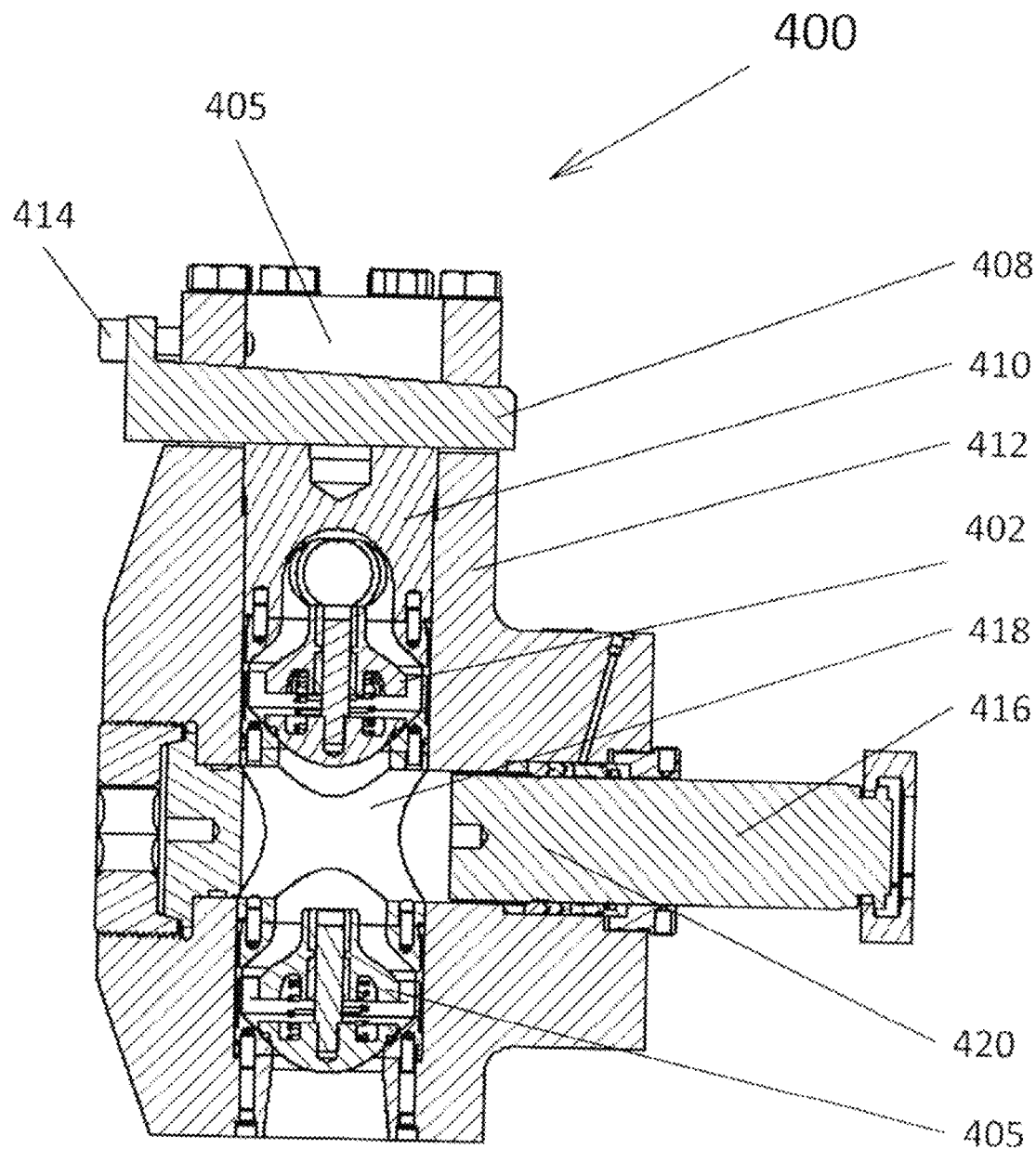
FIG. 4 is a cross-sectional view of the fluid end block of FIG. 3.

Referring to FIG. 4, a cross-sectional view of one example embodiment is illustrated. The fluid end 400 provides two check valves in the design. An upper check valve 402 and a lower check valve 404 are provided in a vertical bore 406 of the fluid end. The location of the upper check valve 402 and the lower check valve 404 in the configuration allows the valves to be maintained through a top access of the fluid end 400. Components are maintained in position through a wedge retention system 408 that retains a flow plug 410 within the fluid end block 412. The wedge retention system 408 may be secured to the fluid end block 412 through a bolted connection 414. In one example embodiment, the bolted connection 414 uses two bolts.

The upper check valve 402 and the lower check valve 404 are oriented to allow flow of fluid through a preferred direction. Each of the upper check valve 402 and the lower check valve 404 may be identical in configuration and design, as illustrated in FIG. 5, described below. As illustrated, the configuration provided in FIG. 3 may have five horizontal piston arrangement 416, therefore in this configuration, five lower check valves 404 are used as well as five upper check valves 402. As will be understood, different fluid end arrangements are possible with differing numbers of pistons, therefore alterations of the potential illustrated embodiment are possible. As provided, a cross piece 418 is provided between a horizontal bore 420 and the vertical bore 406. Such cross piece 418 allows for flow to transmit to the upper check valve 402 from the lower check valve 404.

Figure 5A:
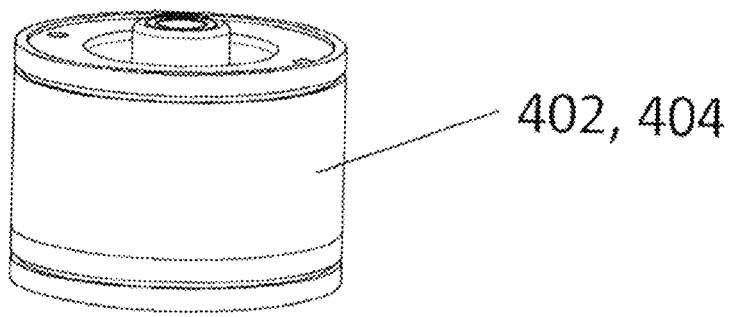
FIG. 5A is a side view of an assembled check valve used in accordance with FIG. 3.
Figure 5B:
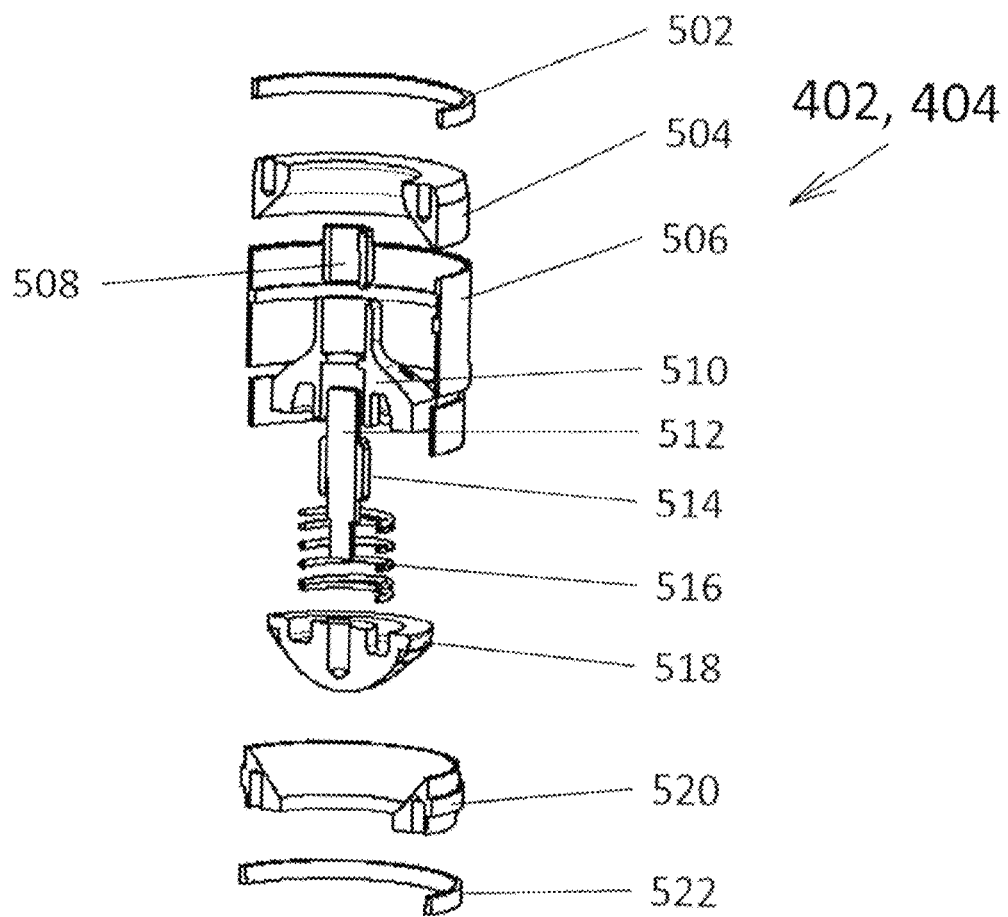
FIG. 5B is a exploded view of the check valve of FIG. 5A.

Referring to FIGS. 5A and 5B, a check valve 402, 404 is illustrated. The check valve 402, 404 may be used as the upper or lower check valve as described in relation to FIG. 4. The check valve 402, 404 is constructed as a one-piece sub assembly, i.e. all parts of the check valve are assembled into a single cartridge style unit. In FIG. 5A, an assembled check valve 402, 404 is illustrated. In FIG. 5B, an exploded view of the check valve 402, 404 is illustrated. The check valve 402, 404 has a seal 502, that is positioned at least partially around an outlet 504. The check valve 402, 404 further has an outer body 506 that houses bearings 508 and a center core 510. A guide stem 512 is positioned extending from the center core 510 through a bearing 514. A spring 516 provides for compression on the internal components of the check valve 402, 404. The spring connects with the valve end 518. Sealing is provided between the valve end 518 and an inlet valve seat 520. A bottom seal 522 is provided to at least partially encircle the inlet valve seat 520. In embodiments, the valve end 518 may have different configurations. The valve end 518 may have a hemispherical end in one example embodiment. Other embodiments may allow for the valve end 518 to have an ellipsoid circular or semi-circular end.

During assembly, the interfacing items are a location/press fit together ensuring consistent assembly and alignment. Once assembled the press-fit make-up ensure no fluid by-pass through connecting faces, reducing potential wash-out.

Material selection of the check valve 402, 404 ensure corrosion between the fluid end 400 and the check valve 402, 404 is minimised/eliminated, so the check valve 402, 404 does not become seized.

Note the check valve 402, 404 design allows for in increased flow path, i.e. conventional fluid end machining has limited scope to open up bores to prevent flow restriction, e.g. a conventional fluid end may only have a 2⅝" bore exit for discharge, whereas with the style of check valve 402, 404 and vertical bore 406, the discharge aperture can be significantly larger, therefore reducing flow restriction and better flow dynamics.

The fluid end 400 is machined with a single vertical cylindrical bore 406, enabling the location of the cartridge style check valve 402, cross piece 418 and lower check valve 404, to locate within the bore 406.

Figure 6:
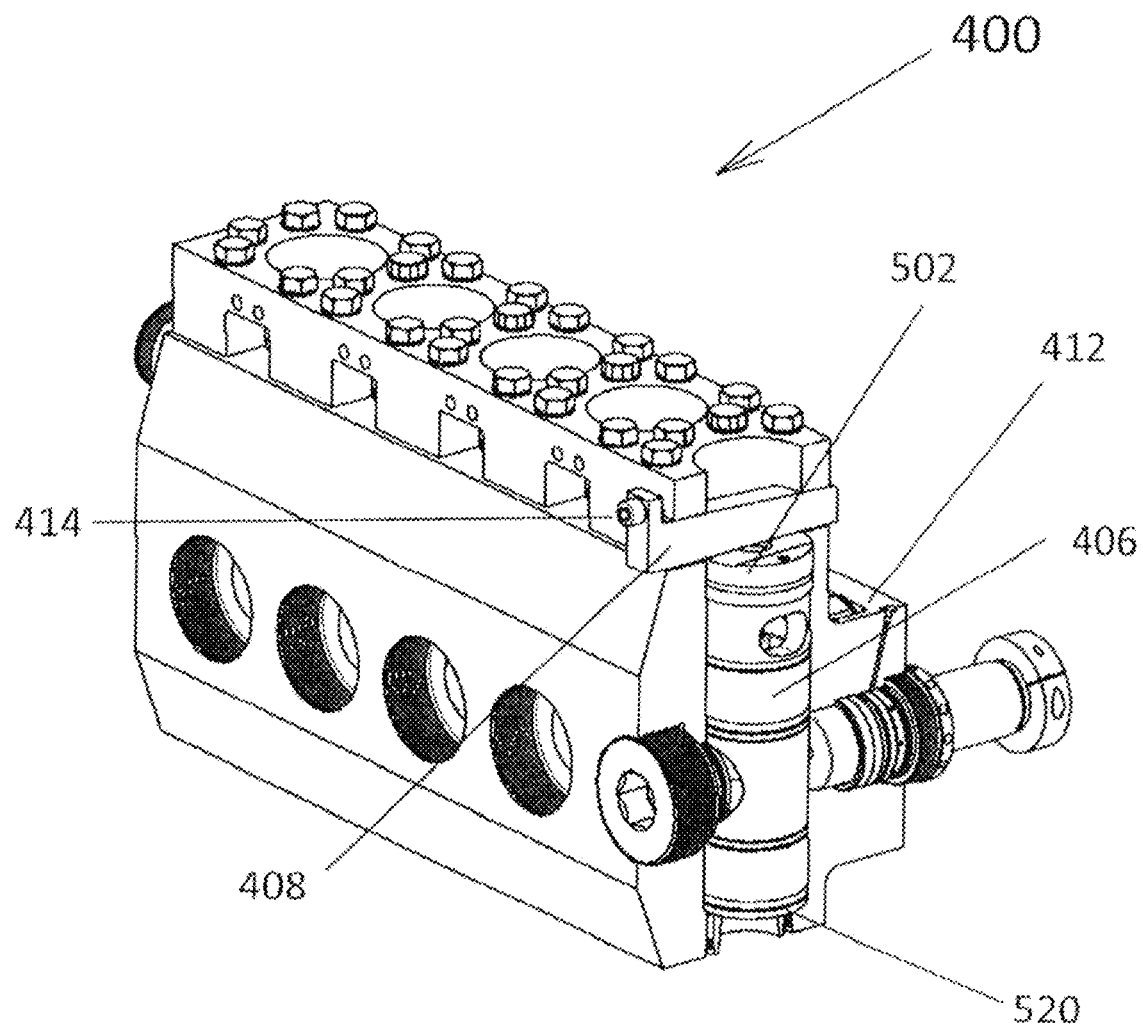
FIG. 6 is a side perspective view of fluid end in one example embodiment of the disclosure with intersecting horizontal and vertical bores.

Referring to FIG. 6, a perspective view of the fluid end 400 block 412 is illustrated with portions of the block 412 removed for illustration clarity. In FIG. 6, during initial assembly the seals 502, 520 are unseated, resulting in the component stack being slightly high. The wedge retention system 408 provides a number of benefits over a conventional screwed nut tightening configuration as discussed below.

In these embodiments, the wedge retention system 408 compresses the component stack (components in FIG. 5) to seat the seals 502, 520 and ensures a metal-to-metal face contact between all components in the stack (resulting in less opportunity for wash-out) wherein the seals provide a pressure seal for the components.

In these embodiments, the wedge retention system 408 provides a mechanical advantage for loading the component stack in compression, which is finally retained by the bolted connection 414 previously described. The bolted connection 414 can be easily torqued, providing a consistent and effect jointing make-up.

The vertical bore 406 extends from the top of the block 412 and houses the components described in relation to FIG. 5. The wedge retention system 408 is illustrated installed with the bolted connection 414, thereby keeping the components within the vertical bore 406.

Figure 7:
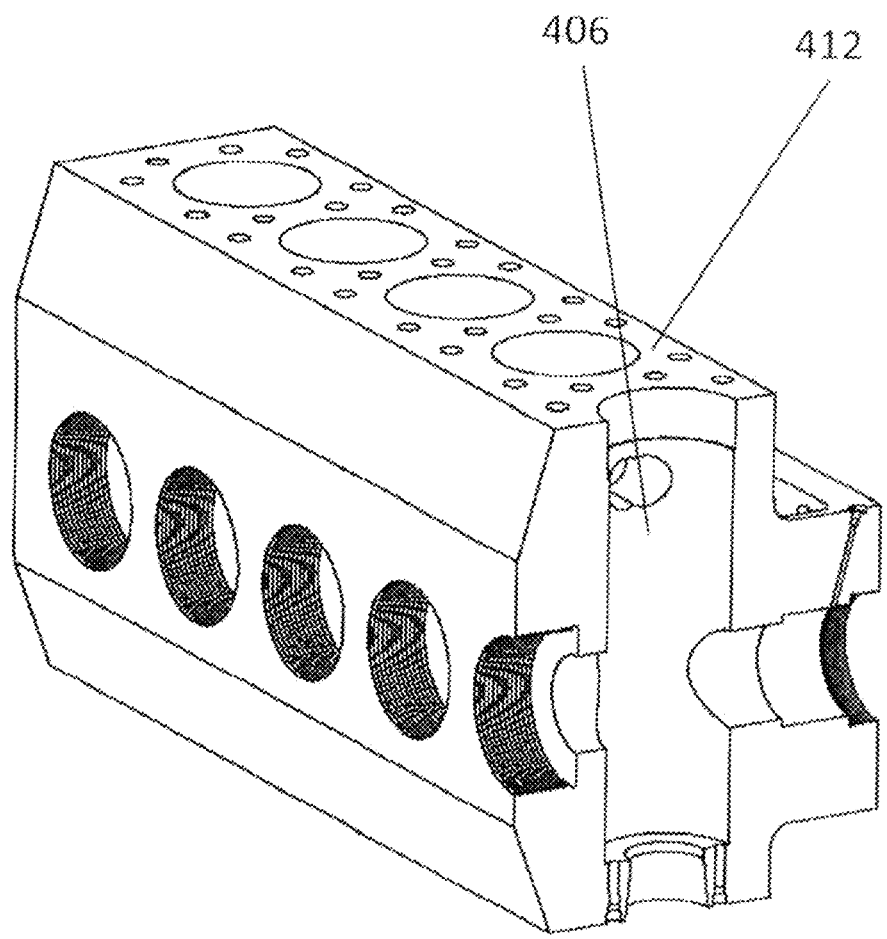
FIG. 7 is a side perspective view of fluid end in one example embodiment of the disclosure with intersecting horizontal and vertical bores removed for drawing clarity.

Referring to FIG. 7, a view of a fluid end block 412 is illustrated. To achieve the above assembly method the fluid end 412 is machined differently from conventional fluid ends. To this end, the fluid end block 412 is created with a simple cylindrical vertical bore 406. With this simplified construction, machining of the fluid end block 412 is more straightforward compared to other conventional systems that require multi-axis machining steps, increasing the overall cost of the system.

The reduced amount of complexity drastic simplifies the machining of the block 412, resulting in reduced cost per fluid end. Further with the cylindrical bore in relation to the horizontal bore, fatigue stressing is drastically reduced, i.e. less areas of stress concentration (caused by the varying profiled bores in the conventional fluid end). The result is a simpler manufactured fluid end with increase life expectancy and bores which are protected via the check valve component stack, resulting in less potential of fluid end wash-out (a problem with existing fluid ends which generally means having to dispose of the fluid end, replacing it with a new unit).

The fluid end embodiment illustrated is intended as a direct replacement for current style fluid ends, i.e. all the interfaces to the pump power end interface are identical. Utilizing the wedge retention system 408 the bolt connection 414 holding the wedge in place are removed and the wedge extracted (as described in FIG. 4. The flow plug 410 has a central threaded feature to allow connection of a extract tool (slide hammer). Using an extraction tool, the flow plug 410 is released and removed through the top of the fluid end 400.

In one embodiment, each check valve is configured with 2 tappings within which again allow attachment of an extraction tool. In one embodiment, the upper check valve 402 is simply extracted through the top of the fluid end 400.

In embodiments, tapping features may also be incorporated within the cross piece 418, wherein the extraction tool may be connected and the cross piece 418 extracted from the vertical bore 406. Finally, the lower check valve 404 is extracted in a similar manner to the upper check valve 402 and extracted from the fluid end bore.

Figure 8:
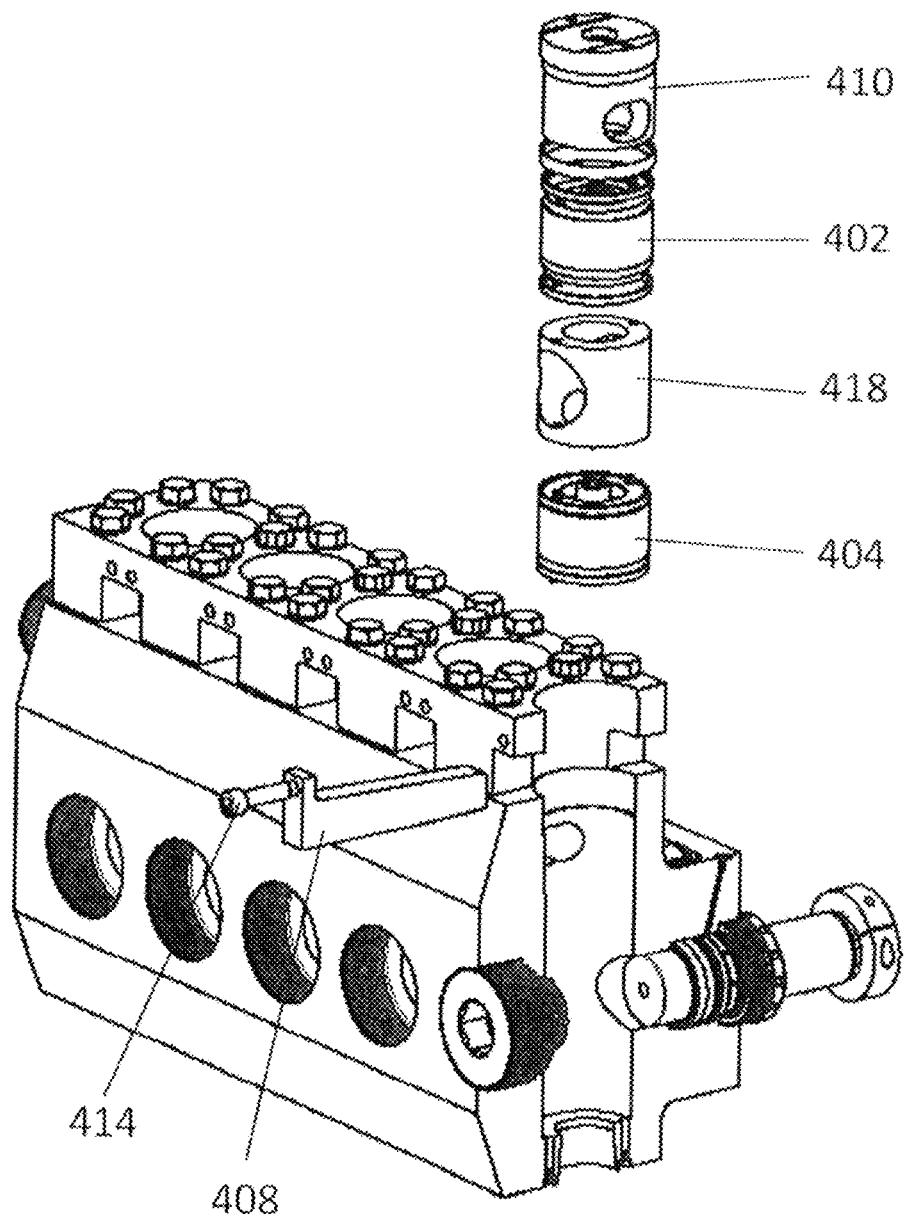
FIG. 8 is a side perspective view of the fluid end of FIG. 3 with exploded upper check valve components.

Referring to FIG. 8, a typical reassembly procedure is illustrated for the valves of the fluid end 400. In this embodiment, the lower check valve 404 is installed within the vertical bore 406. The cross piece is then installed, followed by the upper check valve 402 and the flow plug 410. The wedge retention system 408 is then installed over the flow plug 410, maintaining all components within a defined orientation.

Figure 9:
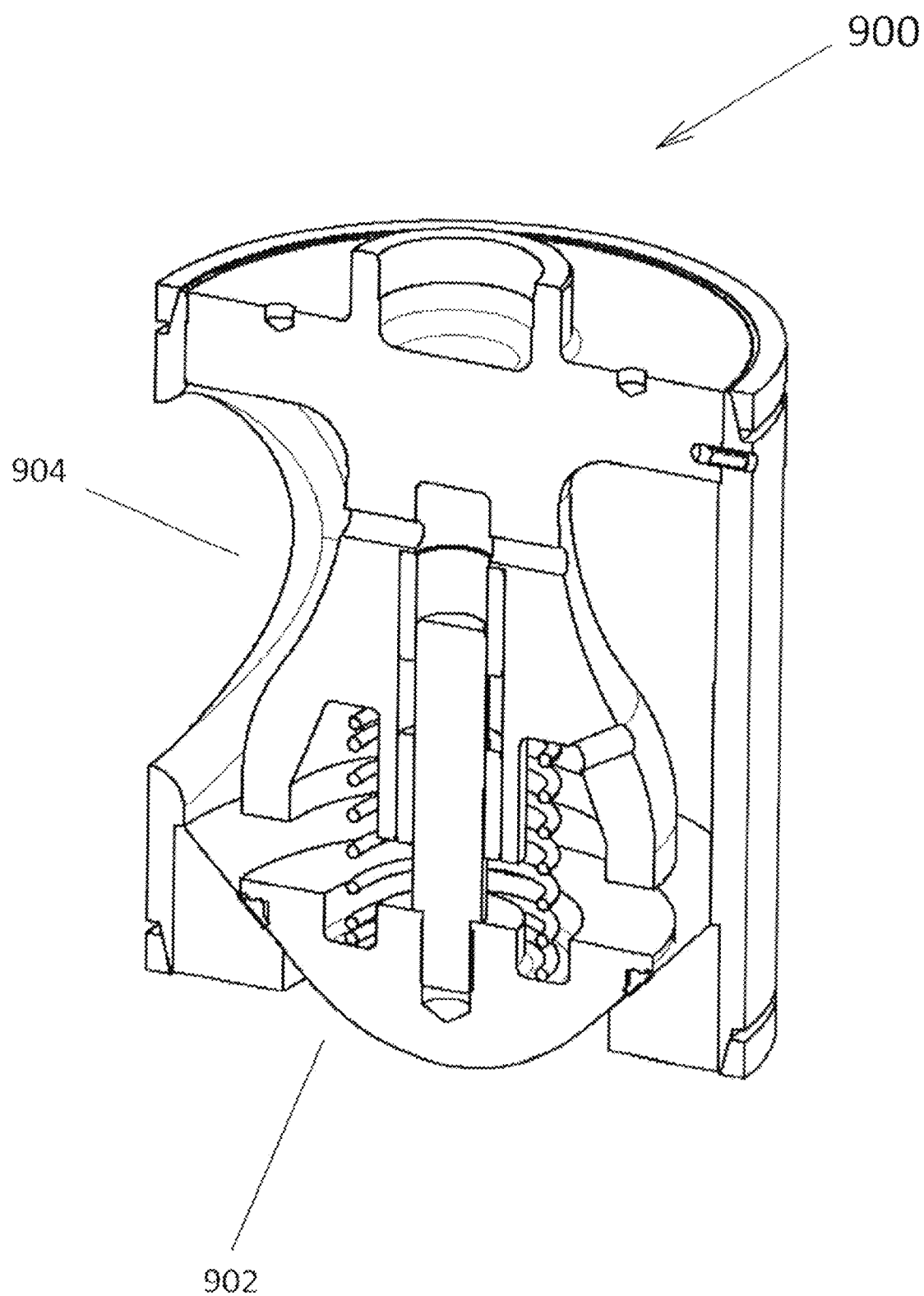
FIG. 9 is a cross-sectional view of a check valve with lower inlet and side ported discharge that may be used in conjunction with the fluid end block of FIG. 3.

Referring to FIG. 9, a further embodiment of a check valve 900 is illustrated. This check valve 900 may be used in the embodiments described above for elements 402 and 404. This check valve 900 provides a lower inlet 902 with a side ported discharge 904 to allow fluid flow through the check valve 900. The components of this check valve 900 are similar as described above.

Figure 10:
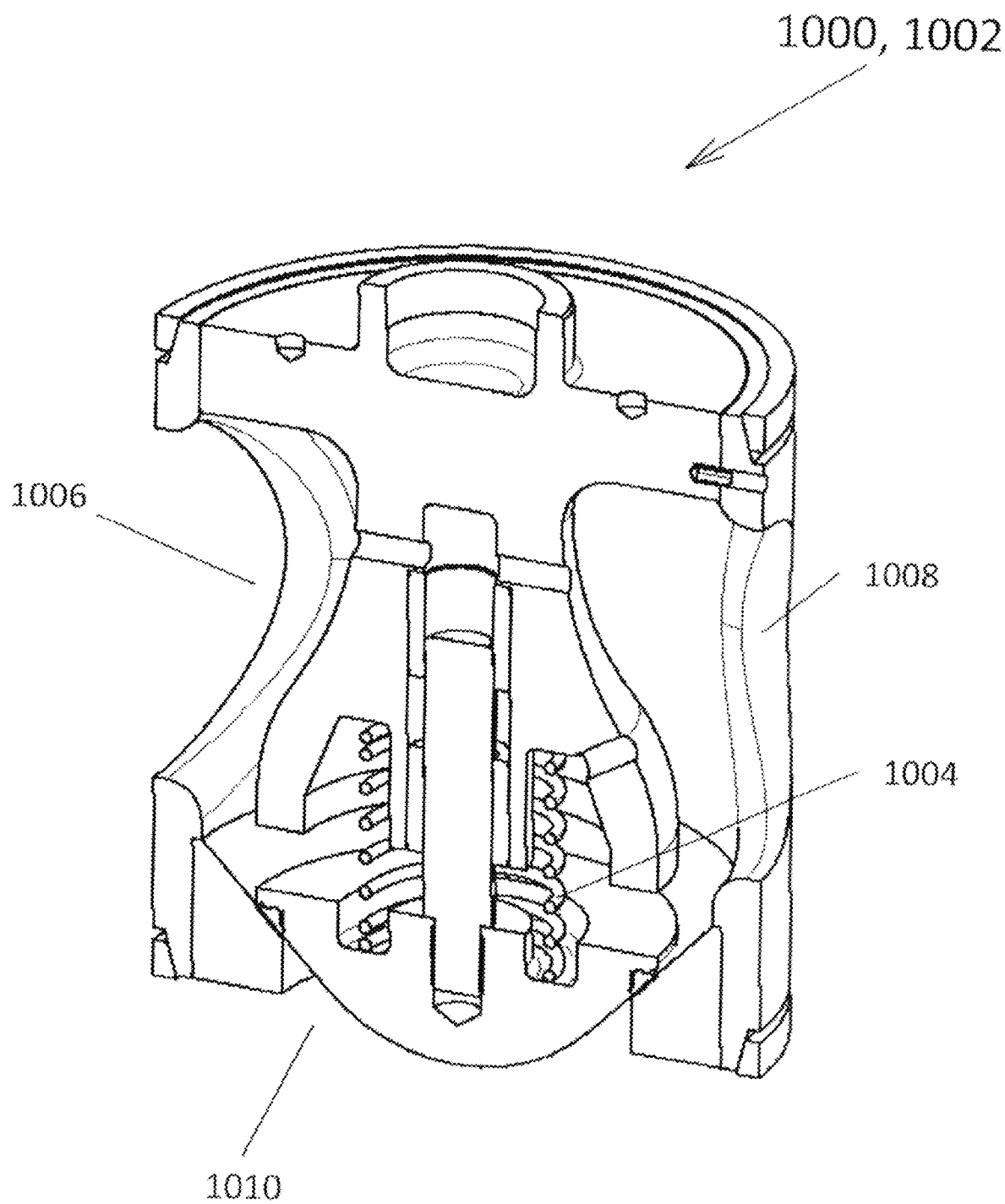
FIG. 10 is a cross-sectional view of a check valve lower inlet with dual ported outlet.

Referring to FIG. 10, a cross sectional view of a check valve lower inlet with dual ported outlet is illustrated. This check valve 1000 may be used in the embodiments described above with elements 402, The check valve of FIG. 10 is configured as a cartridge type unit that may be installed on a unitary basis. The check valve 1000 may have a discharge 1002 that has dual ports to allow fluid to be discharged. A spring 1004 is used to maintain closure of the check valve 1000 with a specific seating pressure. After exceeding this specific seating pressure, fluid flow may progress through the check valve 1000. Other configurations are possible wherein differing strengths of springs 1004 may be used to open and close the valve at different pressure values. This check valve 1000 provides for dual outlets 1006, 1008 for flow in two directions. The inlet 1010 is provided at the base of the unit.

Aspects of the disclosure provide for many advantages compared to conventional apparatus. In embodiments described herein, the arrangements described provide for a single unit that allows for all check valve components within a single cartridge construction.

Aspects of the disclosure allow for superior service capabilities wherein potential leak paths within check valve arrangements are eliminated compared to conventional arrangements.

Aspects of the disclosure also provide for metal to metal construction which eliminate deformation leak paths common in conventional technology.

Aspects of the disclosure also provide for larger flow path size, thereby reducing restrictions within the flowpath. The larger flow path size allows for superior flow performance compared to conventional technology.

The aspects of the disclosure also provide for an arrangement that may be altered to fit field requirements of operations. In some instances, operators may need to have a variable geometry system that will meet the requirements of specific field constraints. Conventional apparatus that are not adaptable cannot perform such functions. Aspects herein can be quickly altered, thereby saving time and field costs for operators.

In embodiments, check valve maintenance may be accessed vertically. Such vertical access allows for easy maintenance for operators, different than conventional apparatus.

In further embodiments, the check valve may be pre-loaded during installation, ensuring correct make-up loading for pressure resistance.

In further embodiments, check valve seals are provided, as described above. The check valve seals provide additional pressure sealing capability, limiting potential wash-out concerns during service operational pressures and flows.

In further aspects of the disclosure, aspects of the configurations provided provide consistent and repeatable check valve stack loading when utilizing a wedge retention system.

Aspects of the disclosure also provide for superior corrosion potential, thereby reducing seizure of the valves.

In the illustrated embodiments, manufacturing the components is vastly more cost effective than conventional apparatus. Such ease of manufacturing allows for superior price performance and increased economic advantages compared to conventional technology.

Fluid performance for the illustrated embodiments is further vastly superior compared to conventional components. Discharge cross bores may be made with larger sizes compared to conventional apparatus. Such large size cross bores allow for superior flow characteristics, reducing turbulent flow and resulting in less pressure loss.

Fatigue life of the systems illustrates is enhanced compared to conventional apparatus. Cross-intersection stresses are reduced, thereby increasing overall fatigue life and enhancing service life.

Figure 11:
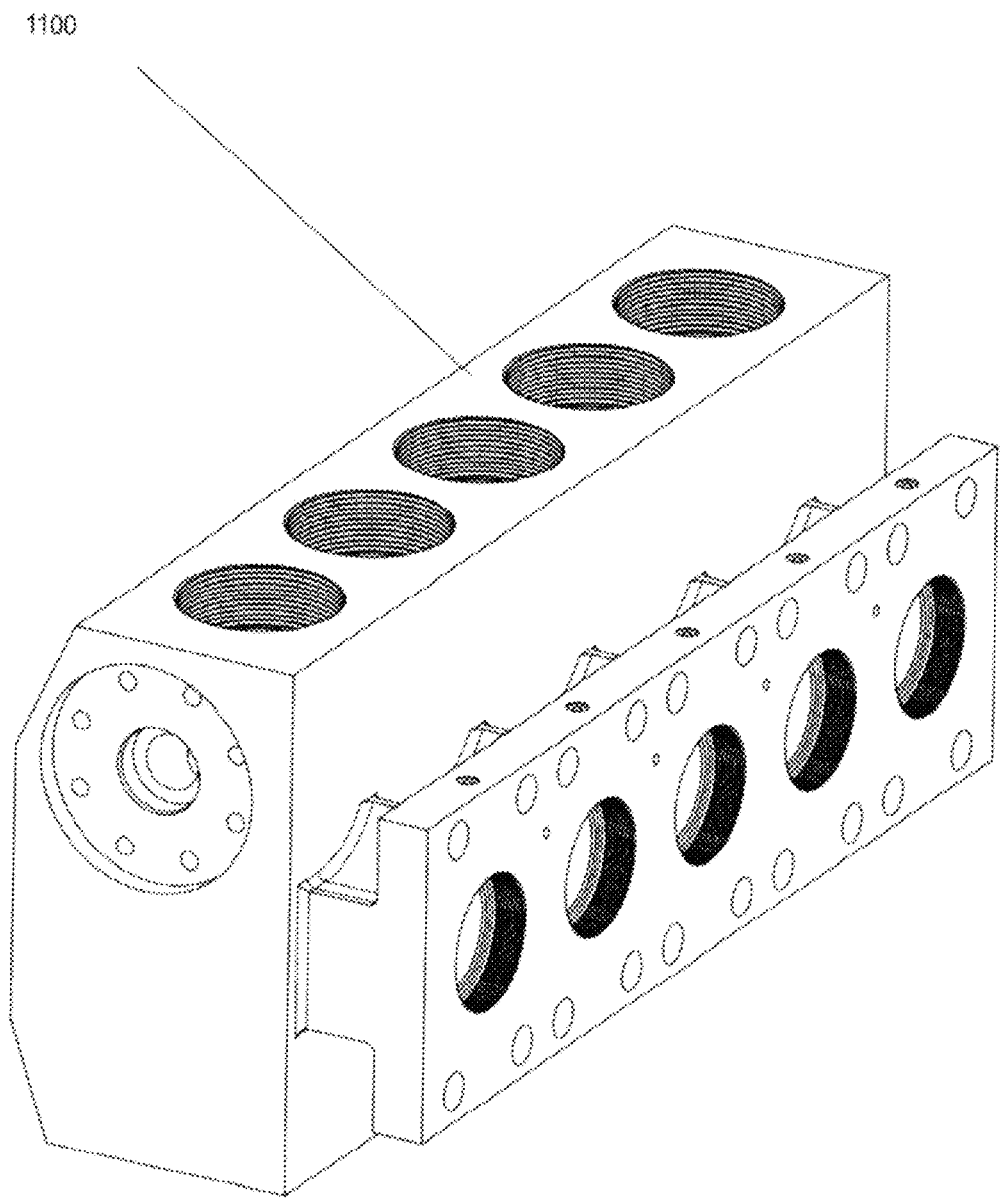
FIG. 11 illustrates a cross-sectional view of typical areas of high stress promoting fatigue cracking.

Referring to FIG. 11, a perspective view of a typical current style fluid end is illustrated. Certain areas of the fluid end promote stress and are prone to fatigue cracking. As illustrated in FIG. 11, a quintuplex bore assembly is illustrated. In the embodiments shown, aspects of the disclosure provide strength to the overall system through the sleeved arrangement disclosed. In one example embodiment, a bore and associated valves are subjected to an initial survey as to whether the components are applicable to be remachined. In some embodiments, the bore of a block will have too much erosion of material that would prevent a successful remachining process. If the defect encountered are able to be removed by the remachining process, then machining may be accomplished and a sleeve may be inserted within the block so that the larger bore can incorporate a sleeve. In embodiments, for example, the inserted sleeve may become the pressure barrier while the surrounding block provides additional support for the inserted sleeve.

In one embodiment of the disclosure, failed fluid ends may be re-machined by boring out substantially the vertical bore of the fluid end. The bore is substantially greater than the existing bore, therefore removing all of the features within the standard bore and removing the areas of prior fatigue cracking.

Figure 12:
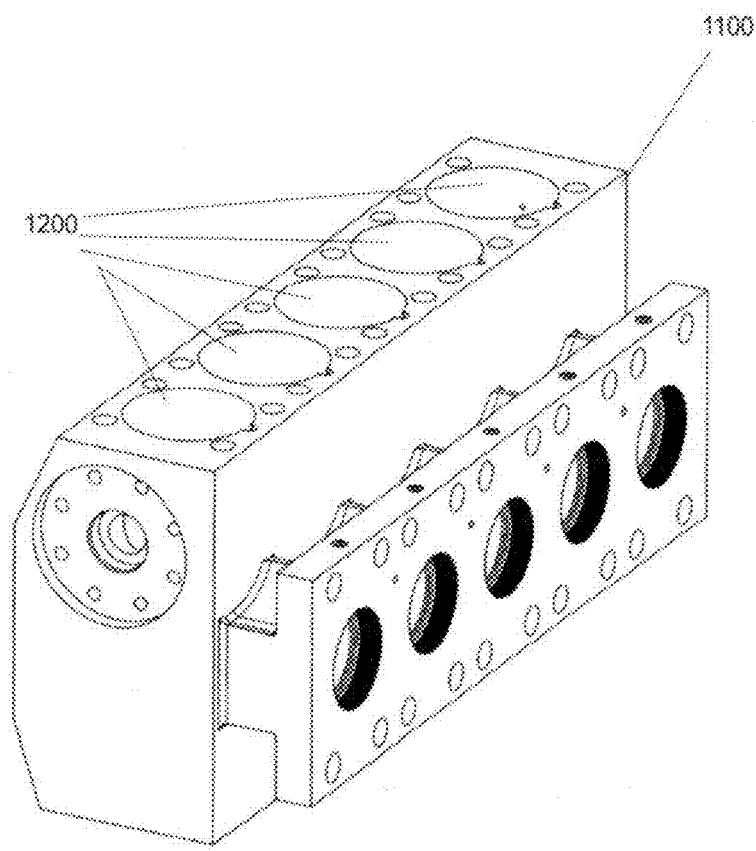
FIG. 12 illustrates a perspective cross-sectional view of a re-machined standard fluid end block.

Referring to FIG. 12, a perspective view of a bore of the fluid end is presented. The vertical bore has been machined to remove all detailed features of the standard fluid end. Additional tappings may be provided for final assembly purposes.

Figure 13:
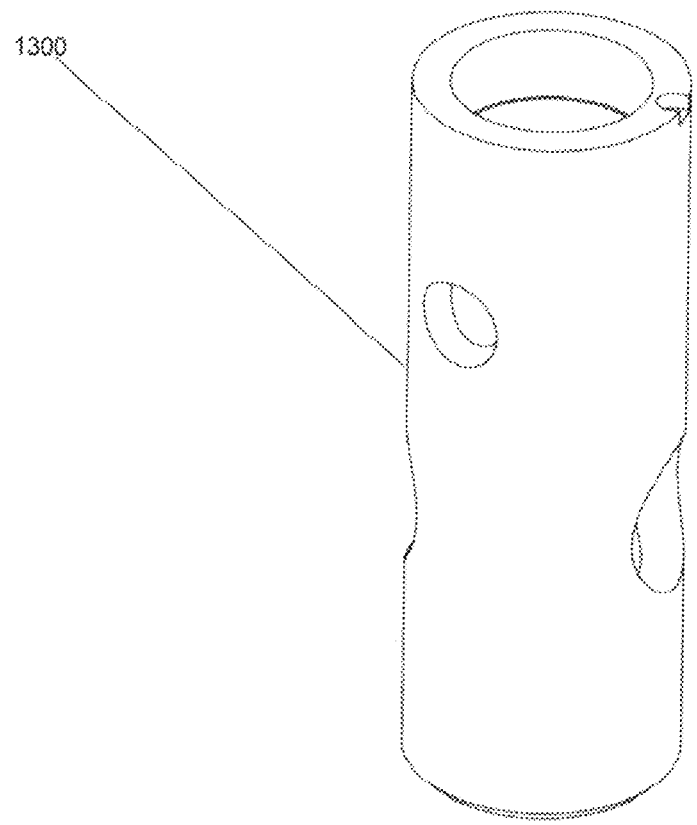
FIG. 13 illustrates a cross-sectional view of a pre-machined sleeve to be used with the remachined standard fluid end of FIG. 12.

Referring to FIG. 13 a cross-sectional view of a pre-machined sleeve is presented The pre-machined sleeve 1300 is presented such that the outer diameter of the pre-machined sleeve 1300 forms a tight fit of the remachined surface of the bore of the fluid end of FIG. 12.

Figure 14:
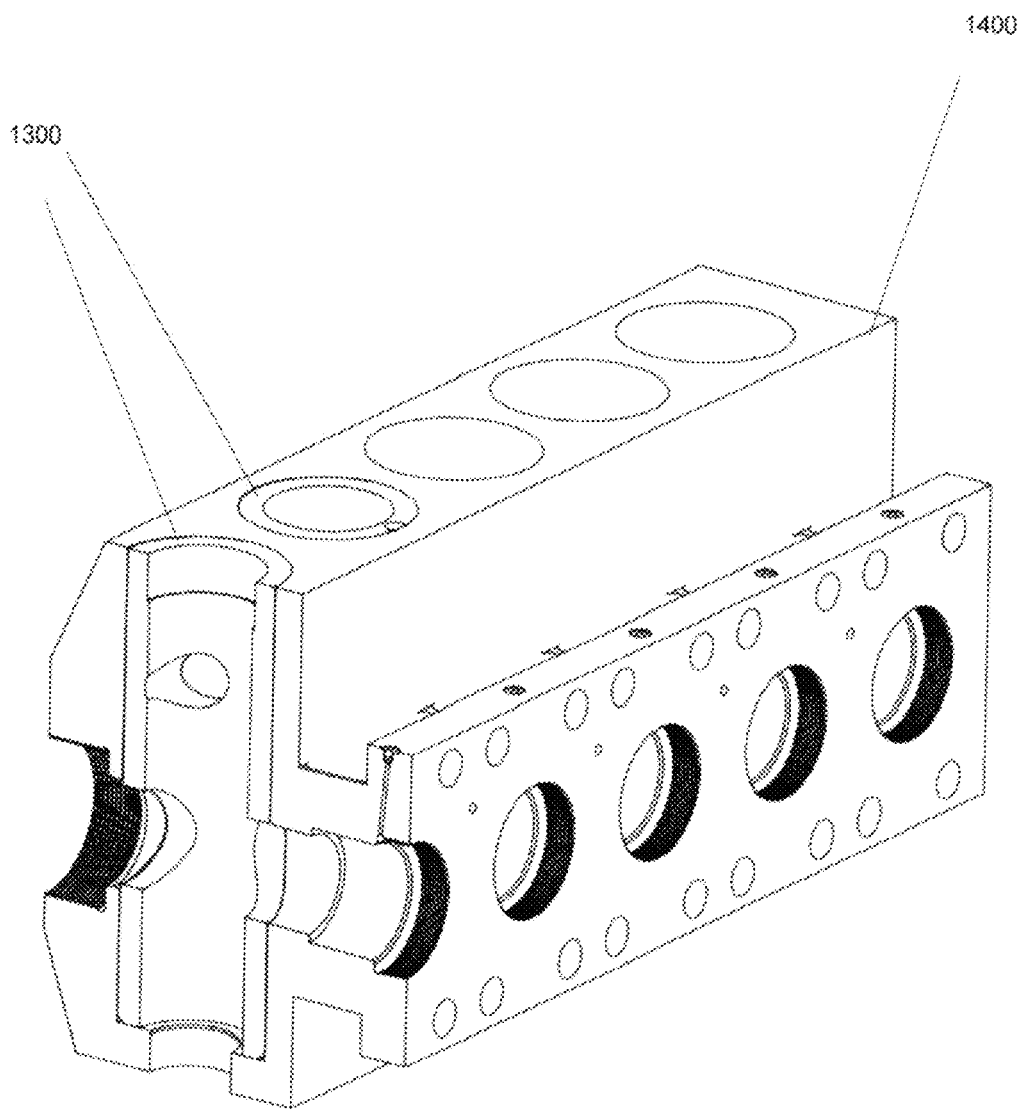
FIG. 14 is a side perspective view of a sleeve fitting into a re-machined vertical bore of the fluid end.

In one embodiment, the sleeve 1300 may be made of a high tensile material, such as a 17-4 ph stainless steel. Other variations are permitted. As seen in the industry, stainless steel fluid ends extend the life substantially of fluid ends. The principle of the sleeve 1300, as presented herein, significantly extends the life of the fluid end. The thickness of the sleeve 1300 may act as in the operational pressure of a tube and/or pressure vessel. In this manner, the sleeve adds to the strength of the basic fluid end. The sleeve 1300 is intended as a shrink fit into the bore of the fluid end, therefore all flow passages are machined within the sleeve 1300, so that when it is fitted to the vertical bore, the plunger aperture (horizontal bore), and discharge ports, align with the fluid end. As presented in FIG. 14, provides a cross-section of a fluid end with the sleeve 1300 fitting shrink fit into the re-machined vertical bore of the fluid end.

In embodiments, the remaining fluid end follows embodiments described above with a fitting of the lower check valve, spacer piece, upper check valve and plug, all restrained as a metal to metal stack within the sleeved bore. The retention method is a simple wedge arrangement held in place with a wedge retention block, being a new item fitted to replace the conventional screwed plug devices of a standard fluid end.

Figure 15:
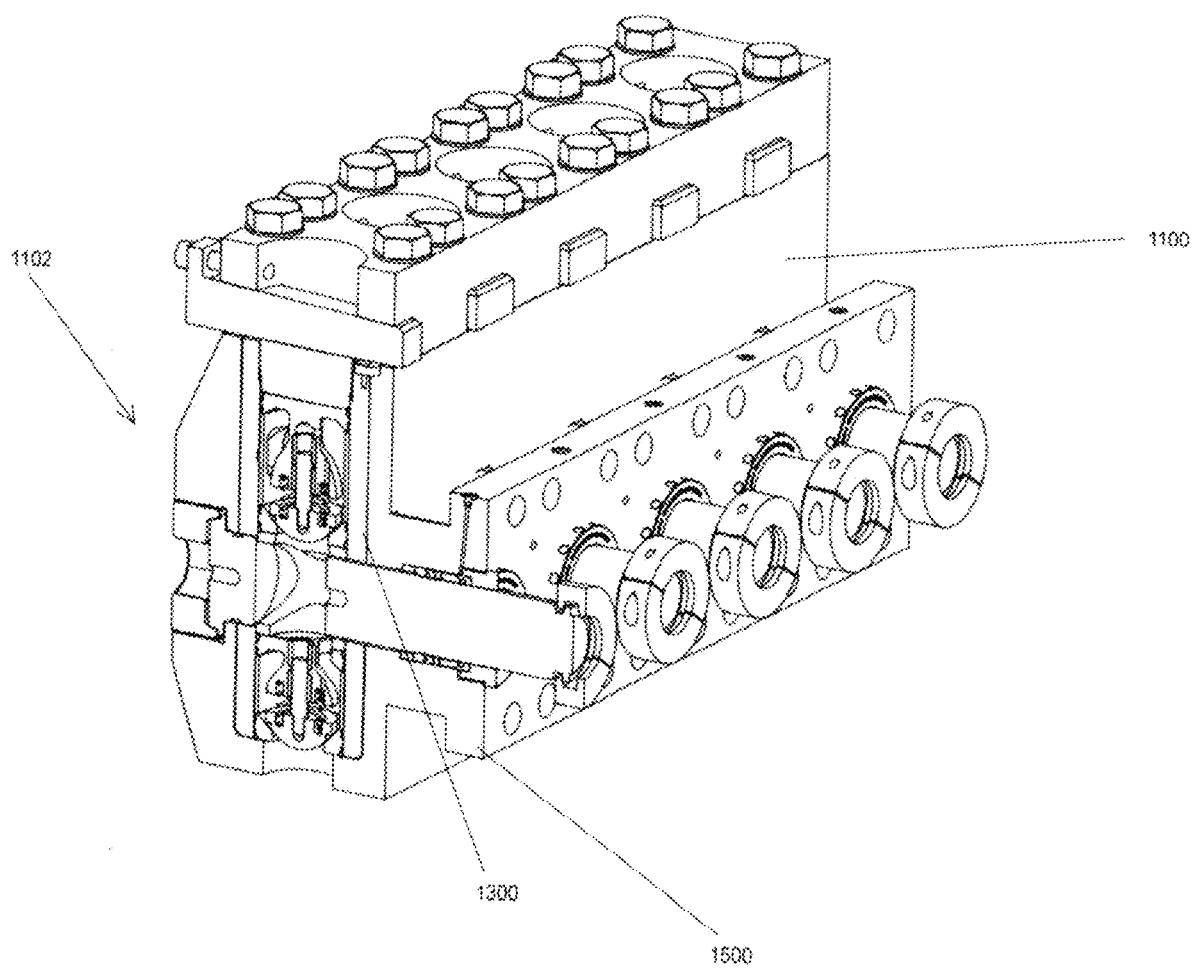
FIG. 15 is a side perspective view of an assembled refurbished fluid end.

Referring to FIG. 15, an assembled refurbished fluid end is illustrated. Sealing of the sleeve to the machined bore is achieved via a shrink fit design (being a metal-to-metal arrangement). Nonetheless, additional elastomer sealing can be accommodated if required with features machined into the sleeve outside diameter, to allow location of elastomer seals which would be pre-fitted prior to the sleeve being fitted to the block. In this manner, there is no possibility of fluid bypass round the outside diameter of the sleeve. Internally, elastomer seals are included at each interface of the check valve stack. In this manner, the elements of the fluid end and the sleeve and pressure contact are isolated.

In one example embodiment, an arrangement is disclosed. The arrangement may comprise a block configured with at least one bore. The arrangement may also comprise at least a first check valve and a second check valve inserted into the at least one bore. The arrangement may also comprise a cross piece positioned in the at least one bore positioned between the first check valve and the second check valve. The arrangement may also comprise a bottom seal positioned at one end of the at least one bore and a seal positioned at another end of the at least one bore. The arrangement may also comprise at least one piston configured to reciprocate within the block. The arrangement may also comprise a wedge retaining system configured to interface with the block and wherein a bottom of the wedge retaining system is configured to interface with the seal.

In another example embodiment, the arrangement may be configured wherein the wedge retaining system is configured with a bolted connection to connect the wedge retaining system to the block.

In another example embodiment, the arrangement may be configured wherein the bolted connection has two bolts.

In another example embodiment, the arrangement may be configured wherein the piston is configured to reciprocate in an axis different than the at least one bore.

In another example embodiment, the arrangement may be configured wherein at least one of the first check valve and the second check valve is a cartridge design.

In another example embodiment, the arrangement may be configured wherein at least one of the first and second check valve is configured with a hemispherical end.

In another embodiment, a cartridge check valve is disclosed. The cartridge check valve may comprise an outer body defining an inner volume. The check valve may also comprise an outlet configured to interface with at least a portion of the outer body. The cartridge check valve may also comprise a seal configured to interface with the outlet. The cartridge check valve may also comprise a guide stem. The cartridge check valve may also comprise a center core configured within the inner volume of the outer body. The cartridge check valve may also comprise a spring configured to interface with the center core and a valve end configured to interface with the spring; wherein upon a predefined pressure and pressures greater than the predefined pressure, the center core is configured to move within the outer body creating a fluid pathway and wherein the guide stem is configured to extend from the valve end to the center core.

In another example embodiment, the cartridge check valve may further comprise at least two bearings.

In another example embodiment, the cartridge check valve may be configured wherein a first of the at least two bearings is positioned between the valve end and the center core.

In another example embodiment, the cartridge check valve may be configured wherein a second of the at least two bearings is positioned on a side opposite of the center core from the first bearing.

In another example embodiment, the cartridge check valve may be configured wherein the cartridge check valve is made of carbon steel.

In another example embodiment, the cartridge check valve may be configured wherein the valve end is configured in a hemispherical shape.

In another embodiment, an arrangement is disclosed. The arrangement may comprise a block configured with at least one bore. The arrangement may also comprise at least a first check valve and a second check valve inserted into the at least one bore. The arrangement may also comprise a cross piece positioned in the at least one bore positioned between the first check valve and the second check valve. The arrangement may also comprise a bottom seal positioned at one end of the at least one bore and a seal positioned at another end of the at least one bore. The arrangement may also comprise at least one piston configured to reciprocate within the block and a wedge retaining system configured to interface with the block. The arrangement may also be configured wherein a bottom of the wedge retaining system is configured to interface with the seal and wherein at least one of the first check valve and the second check valve comprise an outer body defining an inner volume. The arrangement may also be configured with an outlet configured to interface with at least a portion of the outer body wherein the seal is configured to interface with the outlet. The arrangement may also comprise a guide stem and a center core configured within the inner volume of the outer body. The arrangement may also comprise a spring configured to interface with the center core and a valve end configured to interface with the spring; wherein upon a predefined pressure and pressures greater than the predefined pressure, the center core is configured to move within the outer body creating a fluid pathway and wherein the guide stem is configured to extend from the valve end to the center core.

The arrangement may also be configured wherein the wedge retaining system is configured with a bolted connection to connect the wedge retaining system to the block.

The arrangement may also be configured wherein the piston is configured to reciprocate in an axis different than the at least one bore.

The arrangement may also be configured The arrangement wherein at least one of the first check valve and the second check valve is a cartridge design.

The arrangement may also be configured wherein at least one of the first and second check valve is configured with a hemispherical end.

In one example embodiment, an arrangement is disclosed. The arrangement may comprise a block configured with at least one bore wherein each block has been previously used in a hydraulic fluid transfer operation and wherein the block is configured with at least one machined surface to remove metallurgical defects from the block. The arrangement may also comprise at least one sleeve configured to be inserted into each of the at least one bore. The arrangement may also comprise at least a first check valve and a second check valve inserted into each sleeve of the at least one sleeve. The arrangement may also comprise at least one piston configured to reciprocate within the block. The arrangement may also be configured wherein the first check valve and the second check valve are within the block. The arrangement may also comprise a bottom seal positioned at one end of the at least one bore and another seal positioned at an opposite end of the at least one bore. The arrangement may also comprise a wedge retaining system configured to maintain at least two of the first check valve, the second check valve, the bottom seal and the another seal in a relative position.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. An arrangement, comprising:
  a block configured with at least one vertical bore, wherein each block has been previously used in a hydraulic fluid transfer operation and wherein the block is configured with at least one machined surface to remove metallurgical defects from the block;
  at least one sleeve configured to be inserted into each of the at least one vertical bore wherein the at least one sleeve is shrink fit into the block;
  at least a first check valve and a second check valve inserted into each sleeve of the at least one sleeve;
  a cross piece positioned in the at least one vertical bore between the first check valve and the second check valve, wherein the cross-piece is removeable through the at least one vertical bore;
  at least one piston configured to reciprocate within the block;
  the first check valve and the second check valve within the block;
  a bottom seal positioned at one end of the at least one vertical bore and another seal positioned at an opposite end of the at least one vertical bore; and
  a wedge retaining system configured to maintain at least two of the first check valve, the second check valve, the bottom seal and the another seal in a relative position.

2. The arrangement according to claim 1, wherein the wedge retaining system is configured with one of a bolted connection and a mechanical connection.

3. The arrangement according to claim 1, wherein the block is configured to be used in a hydraulic fracturing operation.

4. The arrangement according to claim 1, wherein the at least one sleeve has at least one side penetration.

5. The arrangement according to claim 1, wherein the at least one sleeve is made of stainless steel.

6. The arrangement according to claim 1, wherein the first check valve is a cartridge design.

7. The arrangement according to claim 1, wherein the second check valve is a cartridge design.

8. The arrangement according to claim 1, wherein the bore within the block has the machined surface.

9. The arrangement according to claim 1, wherein the second check valve is landed on a ledge at a bottom of the vertical bore.

10. The arrangement according to claim 1, wherein the vertical bore is cylindrical.

11. The arrangement according to claim 1, wherein the wedge retaining system is positioned at only an upper end of the body with no corresponding wedge retaining system at an opposite end of the at least one vertical bore.

12. An arrangement, comprising:
a block configured with at least one vertical bore, wherein each block has been previously used in a hydraulic fluid transfer operation and wherein the block is configured with at least one machined surface to remove metallurgical defects from the block;
at least one sleeve configured to be inserted into each of the at least one vertical bore;
at least a first check valve and a second check valve inserted into each sleeve of the at least one sleeve;
a cross piece positioned in the at least one vertical bore between the first check valve and the second check valve, wherein the cross-piece is removeable through the at least one vertical bore;
at least one piston configured to reciprocate within the block;
the first check valve and the second check valve within the block;
a bottom seal positioned at one end of the at least one vertical bore and another seal positioned at an opposite end of the at least one vertical bore; and
a wedge retaining system configured to maintain at least two of the first check valve, the second check valve, the bottom seal and the another seal in a relative position, wherein the wedge retaining system is positioned at only an upper end of the body with no corresponding wedge retaining system at an opposite end of the at least one vertical bore with the second check valve landed on a ledge at a bottom of the vertical bore.

13. The arrangement according to claim 12, wherein the wedge retaining system is configured with one of a bolted connection and a mechanical connection.

14. The arrangement according to claim 12, wherein the at least one sleeve has at least one side penetration.

15. The arrangement according to claim 12, wherein the at least one sleeve is made of stainless steel.

16. The arrangement according to claim 12, wherein the first check valve is a cartridge design.

17. The arrangement according to claim 12, wherein the second check valve is a cartridge design.

18. The arrangement according to claim 12, wherein the bore within the block has the machined surface.

19. The arrangement according to claim 12, wherein the at least one sleeve is shrink fit into the block.

* * * * *